Oct. 12, 1948.  W. W. WILLIAMS ET AL  2,451,009
AIRCRAFT CONTROL SURFACE

Filed Oct. 18, 1945  3 Sheets-Sheet 3

INVENTOR
WILLIAM W. WILLIAMS AND HERBERT L. BOWERS
BY
Bean, Brooks, Buckley & Bean. ATTORNEYS Patented Oct. 12, 1948

2,451,009

UNITED STATES PATENT OFFICE 2,451,009

AIRCRAFT CONTROL SURFACE

William W. Williams, Buffalo, and Herbert L. Bowers, Kenmore, N. Y., assignors to Bell Aircraft Corporation, Buffalo, N. Y.

Application October 18, 1945, Serial No. 622,976

9 Claims. (Cl. 244—42)

This invention relates to aircraft, and more particularly to an improved mounting and position control means for extensible-retractable control surfaces or flaps in aircraft.

One of the objects of the invention is to provide an improved gear for mounting in aircraft a control surface of the extensible-retractable flap type such as in the well known Fowler flap type arrangement. Another object of the invention is to provide an improved gear for mounting control flaps and the like in aircraft and controlling the displaced positions and angular attitudes thereof for aircraft control purposes. Another object of the invention is to provide a flap mounting and controlling means as aforesaid in the form of a compact and self-contained unit such as is adapted to be provided to standard specifications and in standard sizes for sale to aircraft manufacturers as complete accessory units. Another object of the invention is to provide a device of the character aforesaid which is adapted to mount and control flaps in arrangements known as the Fowler; Zap; NACA single slotted or double slotted types, and the like. Other objects and advantages of the invention will appear in the specification hereinafter.

Figure 2:
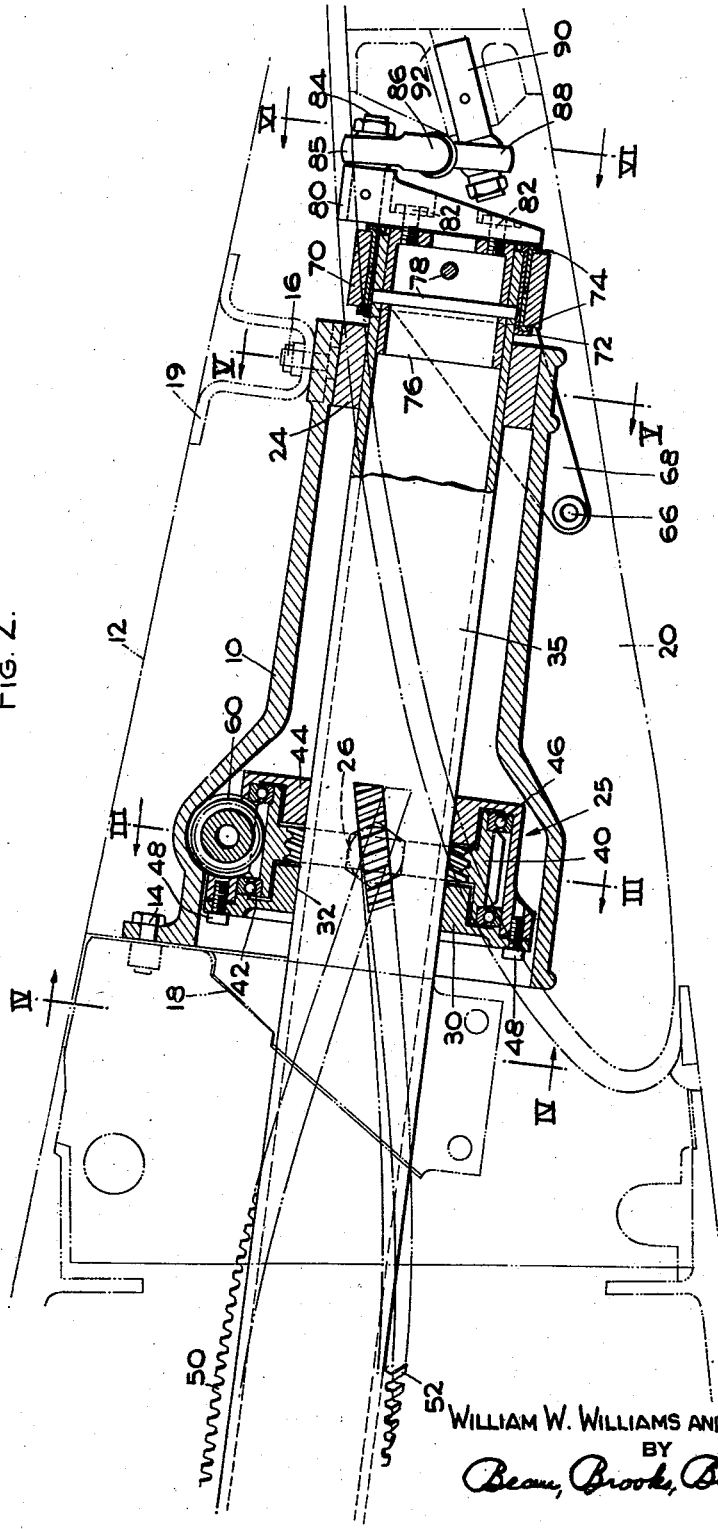
Fig. 2 is an enlarged view of a portion of the structure of Fig. 1, showing the flap mounting and actuating gear in flap-retracted condition.
Figure 3:
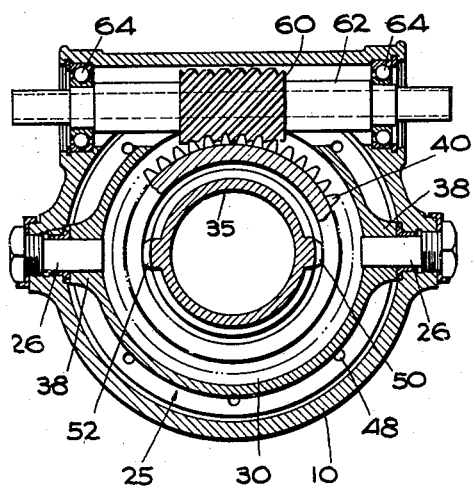
Figure 4:
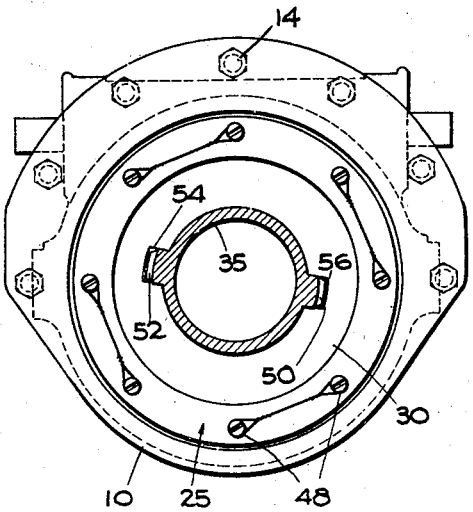
Figure 5:
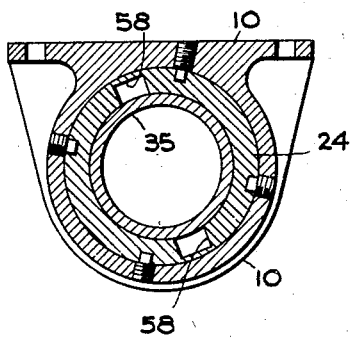
Figure 6:
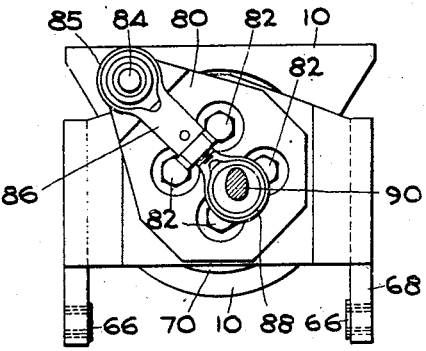

Fig. 3 is a section along line III—III of Fig. 2;
Fig. 4 is a section along line IV—IV of Fig. 2;
Fig. 5 is a section along line V—V of Fig. 2; and
Fig. 6 is a section along line VI—VI of Fig. 2.

The drawings illustrate the invention in the form of a self-contained unit including a generally tubular shaped casing 10 which is bolted into the trailing edge portion of an airplane wing 12 by means of bolts 14—16 engaging bracket portions 18—19 of the wing structure. The gear of the invention is illustrated as carrying a wing trailing edge flap 20 to be movable between its retracted position (wherein the flap 20 is partially nested within a recessed portion of the wing structure) and various rearwardly displaced positions at prescribed variously tilted attitudes, as illustrated at the right hand end portion of Fig. 1.

The casing 10 mounts interiorly thereof at one of its ends a bearing sleeve 24, and adjacent its other end a bearing sleeve and nut gear unit which is indicated generally at 25. The bearing 24 is rigidly mounted relative to the casing 10 while the bearing unit 25 is mounted upon the casing 10 by a trunnion support arrangement comprising aligned horizontal pins 26—26 (Figs. 2-3), as will be explained more fully hereinafter. The bearing unit 25 comprises a collar 30 which is centrally bored at 32 so as to slidably receive therein the flap carrying strut element which is in the form of a tube designated 35; the tube 35 being also slip-fitted into the bore of the bearing 24 so as to extend therethrough for mounting at its outboard end the flap 20, as will also be explained more fully hereinafter.

To mount the bearing unit 25 upon the casing bracket 10, the collar 30 is formed with horizontally extending bosses 38—38 at opposite sides thereof which engage the trunnion pins 26—26 which are in turn mounted within openings in opposite side wall portions of the bracket 10 (Fig. 3). Thus, the bearing collar 30 may rock relative to the bracket 10 as may be required to accommodate deflections of the tube 35 in response to varying cantilever loadings thereon as the flap 20 is projected and retracted and subjected to variable air pressure loads. The bearing unit 25 also includes a nut gear 40 which is rotatably mounted at one of its sides upon the collar 30 by means of an annular ball-bearing unit 42. The nut gear is held against the collar 30 by means of a retaining ring 44 which slip-fits over the tube 35 and holds a second ball-bearing unit 46 against the unit gear as a companion to the bearing 42. The locking ring 44 is fixed in assembled relation with the collar 30 by means of screws as indicated at 48; and thus it will be understood that the nut gear is thereby enclosed between the collar 30 and the ring 44 so as to be freely rotatable therein upon the bearings 42—46.

Figure 1:
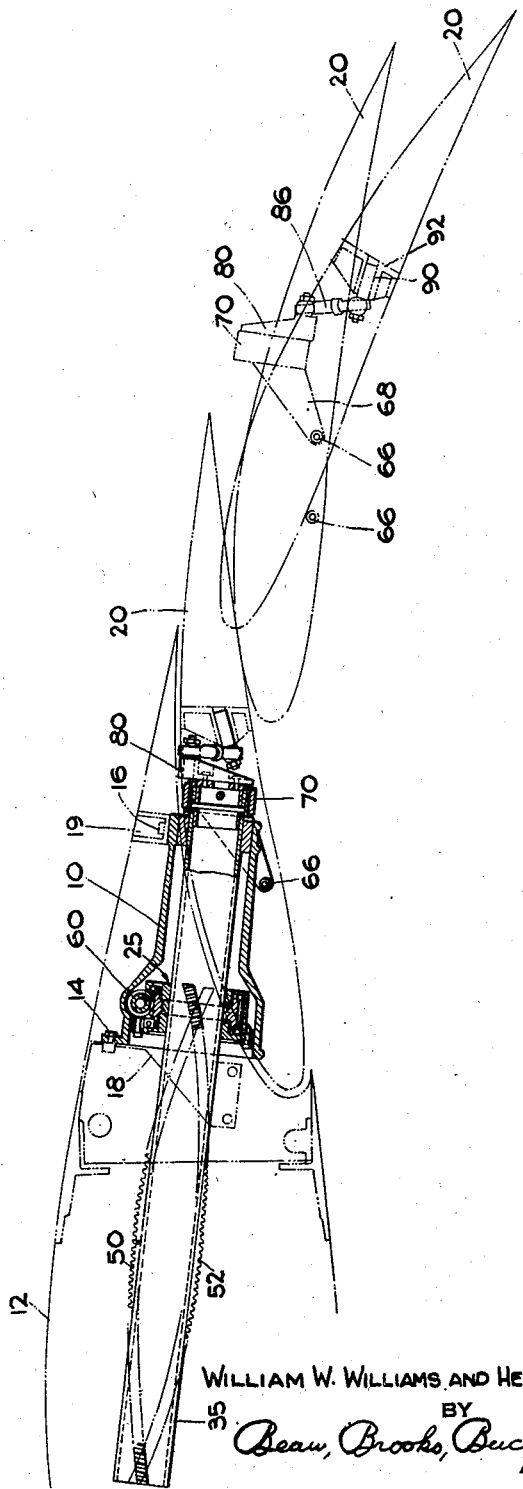
Fig. 1 is a fragmentary wing chord section through an airplane wing showing in section a device of the invention carrying an extensible-retractable flap, and showing diagrammatically the flap and gear in various extended positions and tilted attitudes.

The nut gear 40 is internally threaded for engagement with a pair of lead screw racks 50—52 which are formed on the outer surface of the tube 35 to be integral therewith and to extend generally longitudinally thereof at opposite sides of the tube. The lead screw racks are helically curved as shown in Figs. 1-2 and slide-fit through suitably recessed portions 54—56 of the collar 30 (Fig. 4) so that the tube 35 is freely slidable in longitudinal directions relative to the bearing unit 25; while any such longitudinal displacements of the tube 35 will cause the tube to rotate axially as a result of the camming action between the lead screw racks and the collar 30 (which is fixed against axial rotation). The retaining ring 44 and the bearing 24 are also suitably recessed, as indicated at 58 in Fig. 5, so as to permit the lead screw racks to slide through the ring 44 and the bearing 24 without interference incidental to longitudinal displacements and axial rotations of the tube 35 relative to the bracket 10.

To actuate the tube 35 a worm 60 is arranged in meshed relation with the exteriorly toothed portion of the nut gear 40; the worm being carried by a cross shaft 62 which is supported by bearings 64—64 located at opposite sides of the bracket 10. The shaft 62 is arranged to extend beyond the bracket 10 for engagement with any suitable torque transmitting device which extends into operative connection with a suitable pilot control mechanism, whereby the aircraft pilot may cause the worm 60 to be rotated. This will in turn procure a corresponding rotation of the nut gear 40 whereby the lead screw racks will be pulled upon to cause the tube 35 to slide through the ring 44 and the bearing 24; and coincidental to such longitudinal displacements of the tube 35 it will be caused to rotate about its longitudinal axis.

Thus, it will be understood that rotation of the worm 60 will cause the flap carrying tube to be either extended or retracted telescopically relative to the casing 10 so as to procure a corresponding bodily displacement of the mounted flap relative to the main wing. The flap 20 is connected to the outboard end of the tube 35 by means of a horizontal pivot connection device as indicated at 66; the pivot device 66 being arranged to interconnect the flap 20 and the arms 68 of a yoke member 70 which is centrally bored so as to slide-fit around the tube 35. As shown in Fig. 2, a positioning collar 72 is mounted upon the tube 35 under the yoke head 70 to hold the yoke against displacements to the left relative to the tube as viewed in Figs. 1-2 without interfering with rotation of the tube; and a pair of bronze sleeves 74—74 are inserted between the collar 72 and the yoke head 70 to take the wear of the rotating tube.

An end plug 76 is set into the outboard end of the tube 35 and locked therein by means of cross pins 78—78 which are disposed under the collar 72, and a crank arm 80 is bolted to the outer end of the plug 76 by means of screws 82 so as to provide the crank 80 to be integral with the tube 35 and to cooperate with the collar 72 in positionally fixing the yoke 70 upon the tube 35 without interfering with rotations of the crank tube unit relative to the yoke. The outer end of the crank 80 carries an extending pin 84 which mounts the ball portion of a ball and socket connection device 85 of which the socket portion is formed in one end of a link 86. The other end of the link 86 contains the socket portion of a second ball and socket device 88 which couples upon a ball portion formed upon a pin 90. The pin 90 is fixed into a bracket or structural portion 92 of the flap 20 at a position rearwardly from the pivot connection 66 between the flap and yoke arms 68.

Thus, it will be appreciated that the flap 20 is connected by means of chordwise spaced connection devices at 66—88 to the outboard end of the tube 35 which is in turn carried by the bracket 10 in such manner that the tube 35 projects from the mounting aircraft wing structure to provide a cantilever support for the flap 20 relative to the wing. As explained hereinabove, the tube 35 is extensible-retractable relative to the wing 10 in response to operation of the worm 60, and incidental to such extending and retracting movements of the tube 35 the latter is caused to rotate axially. Such rotations of the tube are not transmitted into the flap carrying yoke 70 but are transmitted to the crank 80 which is thereby caused to rotate with the tube in such manner as to swing the bearing device 85 around the pin 90, thereby changing the vertical distance between the pin 84 and the pin 90. Thus, the rear connection between the flap and the cantilever tube device is shifted vertically as the tube is extended or retracted so as to cause the flap to pivot about the horizontal axis of the connection device 66, thereby assuming changed angles of attack relative to that of the wing 12.

It will be appreciated that the lead screw racks 50—52 may be curved so as to provide any desired pattern of crank rotation incidental to extending-retracting displacements of the flap 20; and that the racks may be either regularly curved or irregularly curved to provide for tilting of the flap at any desired rates and in either direction at different stages of the flap extension-retraction operations. It is preferable that the connection 66 of the yoke arms 68 to the flap 20 be disposed slightly ahead of the center of pressure of the flap in order that the aerodynamic reactions against the flap will be resolved into forces tending to actuate the crank 80 to rotate so as to cause the tube 35 to retract relative to the bracket 10. Thus, a forwardly directed load will be imposed upon the tube 35 which will tend to cancel a portion of the rearwardly directed loads thereon resulting from the drag loads on the flap when the aircraft is in flight, and therefore this arrangement will result in reduction of the forces necessary to effect retraction of the flap from an extended position. Thus, it will be appreciated that all loadings on the flap actuating mechanisms will be minimized.

It will be also appreciated that a particular feature and advantage of the invention is that the bearing unit 25 is carried upon a trunnion device having its axis extending horizontally and transversely of the cantilever tube 35, whereby the bearing collars 24—30 and the nut gear 40 may at all times fit perfectly upon the tube 35 without binding in spite of deflections of the tube under flap-supporting variable load conditions. Thus, the gear will be adapted to function at all times in friction-free manner and will be free from excessive stresses and wearing tendencies. It will also be appreciated that the gear of the invention is particularly adapted to be manufactured as a compact unit to be furnished as a standard subassembly to aircraft manufacturers and that such units may be employed at any suitable intervals spanwise of the flap to be supported and may be conveniently aligned by bolting them to a common spar member or the like in the mounting wing structure. The tube actuating worms may be arranged to be actuated in synchronism by any suitable means such as by connecting them to a common torque shaft or otherwise connecting them to an actuating device for simultaneous operation.

Although only one form of the invention has been shown and described in detail it will be apparent to those skilled in the art that the invention is not so limited but that various changes may be made therein without departing from the spirit of the invention or the scope of the appended claims.

What is claimed is:

1. A mechanism for mounting and controlling extension-retraction motions of an aircraft flap, said mechanism comprising in combination, a bracket adapted to be fixedly mounted upon an aircraft wing structure, a first bearing carried by said bracket in positionally fixed relation thereon, a trunnion bearing device on said bracket, a second bearing carried by said trunnion bearing device for axial alignment with said first bearing while in spaced relation therefrom, said trunnion bearing device having its pivot axis disposed horizontally and transversely of the direction of alignment of said bearings, an arm disposed to extend through said bearings in cantilever mounted relation thereon and so as to be longitudinally slidable and axially rotatable therein, a gear rack projecting from said arm and integral therewith and extending generally longitudinally thereof while being curved helically therearound, said second bearing being recessed to accommodate said gear rack in longitudinally slidable relation therethrough, gear means rotatably mounted upon said second bearing and in mesh with said gear rack and adapted to be coupled to a pilot controlled device for operation of said gear means to procure axial displacement of said arm relative to said bracket and coincident rotation of said arm in response to the camming action of said rack relative to said second bearing, a member carried by the outboard end of said cantilever arm in longitudinally fixed but rotatable relation thereon and carrying a pivot connection device for connection to an aircraft flap about a horizontal pivot axis extending spanwise of the flap, and a crank carried by the outboard end of said arm to rotate therewith and adapted to be connected to said flap at a position spaced from said pivot connection in a direction chordwise of the flap for tilting said flap about said pivot connection in response to rotation of said cantilever arm.

2. A mechanism for mounting and controlling extension-retraction motions of an aircraft flap relative to an aircraft wing, said mechanism comprising in combination, a bracket adapted to be fixedly mounted upon the aircraft wing structure, a first bearing carried by said bracket, a trunnion bearing device on said bracket, a second bearing carried by said trunnion bearing device for axial alignment with said first bearing while in spaced relation therefrom, said trunnion bearing device having its pivot axis disposed horizontally and transversely of the direction of alignment of said bearings, a tubular strut disposed to extend through said bearings in cantilever mounted relation thereon and so as to be longitudinally slidable and axially rotatable therein, a gear rack projecting from said strut and integral therewith and extending generally longitudinally thereof while being curved helically therearound, said second bearing being recessed to accommodate said gear rack in longitudinally slidable relation therethrough, gear means rotatably mounted upon said second bearing and in mesh with said gear rack and adapted to be coupled to a pilot controlled device for operation of said gear means to procure axial displacement of said strut relative to said bracket and coincident rotation of said strut in response to the camming action of said rack relative to said second bearing, a member carried by the outboard end of said cantilever strut in longitudinally fixed but rotatable relation thereon and carrying a pivot connection device for connection to an aircraft flap about a horizontal pivot axis extending spanwise of the flap, and a crank carried by the outboard end of said strut to rotate therewith and adapted to be connected to said flap at a position spaced from said pivot connection in a direction chordwise of the flap for tilting said flap about said pivot connection in response to rotation of said cantilever strut.

3. A mechanism for mounting and controlling extension-retraction motions of an aircraft flap, said mechanism comprising in combination, a bracket adapted to be fixedly mounted upon an aircraft wing structure, a bearing carried by said bracket, a tubular arm disposed to extend through said bearing in cantilever mounted relation thereon and so as to be longitudinally slidable and axially rotatable therein, a gear rack projecting from said arm and integral therewith and extending generally longitudinally thereof while being curved helically therearound, said bearing being recessed to accommodate said gear rack in longitudinally slidable relation therethrough, gear means rotatably mounted upon said bearing and in mesh with said gear rack and adapted to be coupled to a pilot controlled device for operation of said gear means to procure axial displacement of said arm relative to said bracket and coincident rotation of said arm in response to the camming action of said rack relative to said bearing, a member carried by the outboard end of said cantilever arm in longitudinally fixed but rotatable relation thereon and carrying a pivot connection device for connection to an aircraft flap about a horizontal pivot axis extending spanwise of the flap, and a crank carried by the outboard end of said arm to rotate therewith and adapted to be connected to said flap at a position spaced from said pivot connection in a direction chordwise of the flap for tilting said flap about said pivot connection in response to rotation of said cantilever arm.

4. A mechanism for mounting and controlling extension-retraction motions of an aircraft flap, said mechanism comprising in combination, a bracket adapted to be fixedly mounted upon an aircraft wing structure, a bearing carried by said bracket, an arm disposed to extend through said bearing in cantilever mounted relation thereon and so as to be longitudinally slidable and axially rotatable therein, a gear rack integral with said arm and extending longitudinally thereof, curving spline connection means carried by said bearing and said arm for camming said arm to rotate incidental to longitudinal movements thereof, gear means rotatably mounted upon said bearing and in mesh with said gear rack and adapted to be coupled to a pilot controlled device for operation of said gear means to procure axial displacement of said arm relative to said bracket and coincident rotation of said arm, a member carried by the outboard end of said cantilever arm in longitudinally fixed but rotatable relation thereon and carrying a pivot connection device for connection to an aircraft flap about a horizontal pivot axis extending spanwise of the flap, and a crank carried by the outboard end of said arm to rotate therewith and adapted to be connected to said flap at a position spaced from said pivot connection in a direction chordwise of the flap for tilting said flap about said pivot connection in response to rotation of said cantilever arm.

5. A mechanism for mounting and controlling extension-retraction motions of an aircraft flap, said mechanism comprising in combination, a bracket adapted to be fixedly mounted upon an aircraft wing structure, a first bearing carried by said bracket in positionally fixed relation thereon, a trunnion bearing device on said bracket, a second bearing carried by said trunnion bearing device for axial alignment with said first bearing while in spaced relation therefrom, said trunnion bearing device having its pivot axis disposed horizontally and transversely of the direction of alignment of said bearings, an arm disposed to extend through said bearings in cantilever mounted relation thereon and so as to be longitudinally slidable and axially rotatable therein, a gear rack projecting from said arm and integral therewith and extending generally longitudinally thereof while being curved helically therearound, said second bearing being recessed to accommodate said gear rack in longitudinally slidable relation therethrough, gear means rotatably mounted upon said second bearing and in mesh with said gear rack and adapted to be coupled to a pilot controlled device for operation of said gear means to procure axial displacement of said arm relative to said bracket and coincident rotation of said arm in response to the camming action of said rack relative to said second bearing, and means carried by the outboard end of said cantilever arm for mounting said flap upon said arm to move bodily therewith in response to longitudinal displacements of said arm and to alter its angle of attack in response to rotation of said cantilever arm.

6. An aircraft flap mount and control mechanism comprising in combination, a bracket adapted to be fixedly mounted upon an aircraft wing structure, a first bearing carried adjacent one end of said bracket, a second bearing carried by said bracket in aligned spaced relation with respect to said first bearing, said second bearing being mounted upon said bracket by trunnion bearing means having a pivot axis disposed horizontally and transversely of said aligned first and second bearings, a cantilever arm carried upon said bearings in longitudinally slidable and axially rotatable relation thereon, a gear rack integral with said cantilever arm and extending longitudinally thereof, curving spline connection means carried by said second bearing and said arm respectively for causing rotation of said arm incidental to longitudinal displacements thereof relative to said second bearing, gear means carried by said second bearing in mesh with said rack and adapted to be coupled to a pilot controlled device for producing displacements of said cantilever arm axially relative to said second bearing, pivot connection means rotatably carried by the outboard end of said cantilever arm for pivotal connection to an aircraft flap, and a crank carried by said outboard end of said cantilever arm to rotate therewith and adapted to be connected to said flap at a position thereon spaced in chordwise direction from said pivot connection for tilting said flap about said pivot connection in response to rotation of said cantilever arm.

7. An aircraft flap mount and control mechanism comprising in combination, a bracket adapted to be fixedly mounted upon an aircraft wing structure, a rectilinear cantilever arm carried upon said bracket in longitudinally slidable and axially rotatable relation thereon, a gear rack integral with said cantilever arm and extending longitudinally thereof, curving spline connection means carried by said bracket and said arm respectively for causing rotation of said arm incidental to longitudinal displacements thereof relative to said bracket throughout its length of travel, gear means carried by said bracket in mesh with said rack and adapted to be coupled to a pilot controlled device for producing displacements of said cantilever arm axially relative to said bracket, pivot connection means rotatably carried by the outboard end of said cantilever arm and extending rearwardly of said end for pivotal connection to an aircraft flap, and a crank carried by said outboard end of said cantilever arm to rotate therewith and adapted to be pivotally connected to said flap at a position thereon spaced in chordwise direction from said pivot connection for tilting said flap about said pivot connection in response to rotation of said cantilever arm.

8. An aircraft flap mount and control mechanism comprising in combination, a bracket adapted to be fixedly mounted upon an aircraft wing structure, a cantilever arm carried upon said bracket in longitudinally slidable and axially rotatable relation thereon, pilot controlled means for actuating said arm to move longitudinally relative to said bracket, means carried by said arm and said bracket for causing rotation of said arm incidental to longitudinal displacements thereof relative to said bracket throughout its length of travel, pivot connection means rotatably carried upon the outboard end of said cantilever arm and extending rearwardly of said end for pivotal connection to an aircraft flap, and a crank carried by said outboard end of said cantilever arm to rotate therewith throughout the longitudinal travel of said arm and adapted to be pivotally connected to said flap at a position thereon spaced in chordwise direction from said pivot connection for tilting said flap about said pivot connection in response to rotation of said cantilever arm.

9. In combination, an aircraft wing, an aircraft flap mount and control mechanism comprising a bracket adapted to be fixedly mounted upon said aircraft wing structure, a first bearing carried adjacent one end of said bracket, a second bearing carried by said bracket in aligned spaced relation with respect to said first bearing, said second bearing being mounted upon said bracket by trunnion bearing means having a pivot axis disposed horizontally and transversely of said aligned first and second bearings, a cantilever arm carried upon said bearings in longitudinally slidable and axially rotatable relation thereon, a gear rack integral with said cantilever arm and extending longitudinally thereof, curving spline connection means carried by said second bearing and said arm respectively for causing rotation of said arm incidental to longitudinal displacements thereof relative to said second bearing, gear means carried by said second bearing in mesh with said rack and adapted to be coupled to a pilot controlled device for producing displacements of said cantilever arm axially relative to said second bearing, an aircraft flap, pivot connection means rotatably carried by the outboard end of said cantilever arm for pivotal connection to said aircraft flap at a position ahead of the chordwise station of the center of pressure of the flap, and a crank carried by said outboard end of said cantilever arm to rotate therewith and adapted to be connected to said flap at a position thereon spaced in chordwise direction rearwardly from said pivot connection for tilting said flap about said pivot connection in response to rotation of said cantilever arm.

WILLIAM W. WILLIAMS.
HERBERT L. BOWERS.

REFERENCES CITED

The following references are of record in the file of this patent:

UNITED STATES PATENTS

| Number | Name | Date |
|---|---|---|
| 2,218,822 | Joyce | Oct. 22, 1940 |